United States Patent
Wan

(10) Patent No.: US 9,118,883 B2
(45) Date of Patent: Aug. 25, 2015

(54) HIGH DYNAMIC RANGE IMAGING WITH MULTI-STORAGE PIXELS

(71) Applicant: Semiconductor Components Industries, LLC, Phoenix, AZ (US)

(72) Inventor: Chung Chun Wan, Fremont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 100 days.

(21) Appl. No.: 13/687,380

(22) Filed: Nov. 28, 2012

(65) Prior Publication Data

US 2013/0135486 A1    May 30, 2013

Related U.S. Application Data

(60) Provisional application No. 61/563,983, filed on Nov. 28, 2011.

(51) Int. Cl.
*H04N 5/335*    (2011.01)
*H04N 5/765*    (2006.01)
*H04N 5/374*    (2011.01)
*H04N 5/77*    (2006.01)

(52) U.S. Cl.
CPC .............. *H04N 5/765* (2013.01); *H04N 5/335* (2013.01); *H04N 5/374* (2013.01); *H04N 5/772* (2013.01)

(58) Field of Classification Search
CPC ....... H04N 5/765; H04N 5/335; H04N 5/374; H04N 5/378; H04N 5/3741; H04N 5/37452
USPC ................................... 348/294, 308
See application file for complete search history.

(56) References Cited

U.S. PATENT DOCUMENTS

| 4,885,634 | A | 12/1989 | Yabe |
| 6,078,037 | A * | 6/2000 | Booth, Jr. ................... 250/208.1 |
| 7,414,233 | B2 | 8/2008 | Asaba |
| 7,697,051 | B2 | 4/2010 | Krymski |
| 7,889,258 | B2 | 2/2011 | Want et al. |
| 2003/0028078 | A1 | 2/2003 | Glukhovsky |
| 2004/0218078 | A1* | 11/2004 | Lee ............................... 348/308 |

(Continued)

FOREIGN PATENT DOCUMENTS

| EP | 2320460 | 5/2011 |
| EP | 2519001 | 10/2011 |
| WO | WO 2009133967 A2 * | 11/2009 |

OTHER PUBLICATIONS

Chung Chun Wan, U.S. Appl. No. 13/557,656, filed Jul. 25, 2012.

*Primary Examiner* — Nicholas Giles
*Assistant Examiner* — Abdelaaziz Tissire
(74) *Attorney, Agent, or Firm* — Treyz Law Group; Michael H. Lyons

(57) ABSTRACT

High dynamic range imaging techniques with multi-storage pixels are provided. Multiple images may be captured during a single exposure using an image sensor with multi-storage pixels. During a single exposure, charge from photodiodes may be transferred alternately to multiple storage nodes of the multi-storage pixels. During readout of a multi-storage pixel, charge may be transferred from each of multiple storage nodes one at a time to a floating diffusion node. Each subsequent transfer of charge may be summed with the charge already stored in the floating diffusion node. A pixel signal may be read out from the multi-storage pixel after each charge transfer. Images formed from the pixel signals may be combined to produce a high dynamic range image.

16 Claims, 7 Drawing Sheets

(56) References Cited

U.S. PATENT DOCUMENTS

| | | |
|---|---|---|
| 2005/0110093 A1 | 5/2005 | Altice |
| 2005/0157194 A1* | 7/2005 | Altice .......................... 348/308 |
| 2006/0044437 A1 | 3/2006 | Shah |
| 2006/0181627 A1* | 8/2006 | Farrier ........................ 348/308 |
| 2008/0018763 A1* | 1/2008 | Sato ............................. 348/308 |
| 2008/0231737 A1* | 9/2008 | Weale et al. ................. 348/308 |
| 2009/0095986 A1* | 4/2009 | Neukom ....................... 257/225 |
| 2010/0188491 A1 | 7/2010 | Shizukuishi |
| 2010/0201797 A1* | 8/2010 | Shizukuishi et al. ........... 348/68 |
| 2011/0007196 A1* | 1/2011 | Yamashita et al. ........... 348/294 |
| 2011/0090385 A1* | 4/2011 | Aoyama et al. .............. 348/308 |
| 2011/0134298 A1* | 6/2011 | Aoyama ....................... 348/311 |
| 2011/0221943 A1* | 9/2011 | Koizumi ...................... 348/294 |
| 2012/0033118 A1* | 2/2012 | Lee et al. ..................... 348/296 |
| 2012/0257093 A1* | 10/2012 | Sa et al. ....................... 348/302 |
| 2013/0027596 A1* | 1/2013 | Wan ............................. 348/302 |
| 2013/0206964 A1* | 8/2013 | Yamashita et al. ......... 250/208.1 |

* cited by examiner

US 9,118,883 B2

HIGH DYNAMIC RANGE IMAGING WITH MULTI-STORAGE PIXELS

This application claims the benefit of provisional patent application No. 61/563,983, filed Nov. 28, 2011, which is hereby incorporated by reference herein in its entirety.

BACKGROUND

This relates generally to imaging devices, and more particularly, to high dynamic range imaging with multi-storage pixels.

Image sensors are commonly used in electronic devices such as cellular telephones, cameras, and computers to capture images. An image sensor has an associated dynamic range, which is expressed as a ratio of the largest and smallest possible luminance values for an image sensor. A conventional image sensor might have a dynamic range of about 60-70 dB. Some applications, such as automobile and surveillance applications, might require a dynamic range of over 100 dB. High dynamic range (HDR) imaging often refers to techniques for capturing images at dynamic ranges greater than that of the associated image sensor. Techniques such as nonlinear response, multiple exposure, and saturation detection have been proposed for high dynamic range imaging. Each technique has its advantages and disadvantages. One of the most common HDR techniques is multi-exposure imaging.

In multi-exposure HDR imaging, multiple images are captured with an image sensor at different exposure times. The images are later combined into a high dynamic range image. However, as the multiple exposures are captured at different times, it may be difficult to correctly capture images of moving objects.

It would therefore be desirable to be able to provide improved techniques for high dynamic range imaging.

DETAILED DESCRIPTION

Figure 1A:
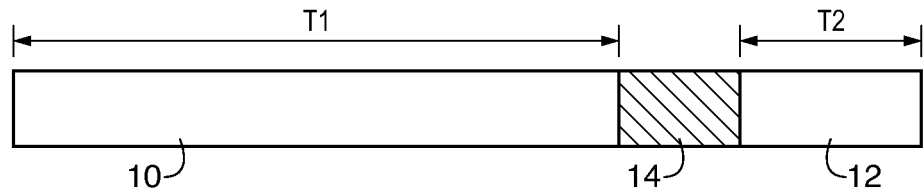
FIG. 1A is a diagram of a conventional multi-exposure high dynamic range imaging technique having a readout period between image captures.

A conventional technique for multi-exposure high dynamic range imaging is shown in FIG. 1A. A first image 10 is taken with a long exposure time T1. A second image 12 is taken with a short exposure time T2. The long exposure image 10 better captures low-light portions of a scene, while short exposure image 12 better captures bright portions of the scene. The multi-exposure images 10 and 12 are later combined to produce a high dynamic range image. The images 10 and 12 are combined in such a way that pixel information from long exposure image 10 is predominantly used for low-light portions of the scene while pixel information from short exposure image 12 is predominantly used for bright portions of the scene.

As shown in FIG. 1A, long exposure image 10 and short exposure image 12 are captured at different times that are separated by a readout period 14. It can therefore be difficult to correctly image scenes with moving objects. Moving objects in the scene might appear at different positions in the captured images 10 and 12. Sophisticated image registration and motion compensation algorithms would need to be used during image processing or else motion artifacts might appear in the synthesized HDR image. If the image processing algorithms do not handle the motion effectively, reconstruction artifacts can appear in the final HDR image. In addition, since the time T2 is very short, short exposure image 12 might miss brief events in a scene, such as LED signals which are important in surveillance or automotive applications.

Figure 1B:
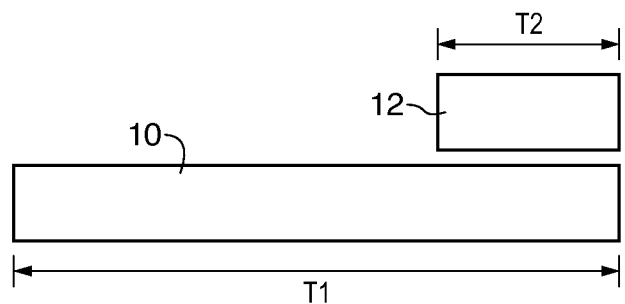
FIG. 1B is a diagram of a conventional multi-exposure high dynamic range imaging technique having, image captures that partially overlap in time.

Another conventional technique for multi-exposure high dynamic range imaging is shown in FIG. 1B. In FIG. 1B, long exposure image 10 and short exposure image 12 partially overlap in time. A first portion of in image sensor can be used to capture image 10 and a second portion of an image sensor can be used to capture image 12. However, the technique of FIG. 1B results in a loss of resolution for the images 10 and 12. The technique of FIG. 1B also still results in some differences in capturing motion between the images 10 and 12. Short-exposure image 1 could still miss brief events such as LED signals.

Figure 2:
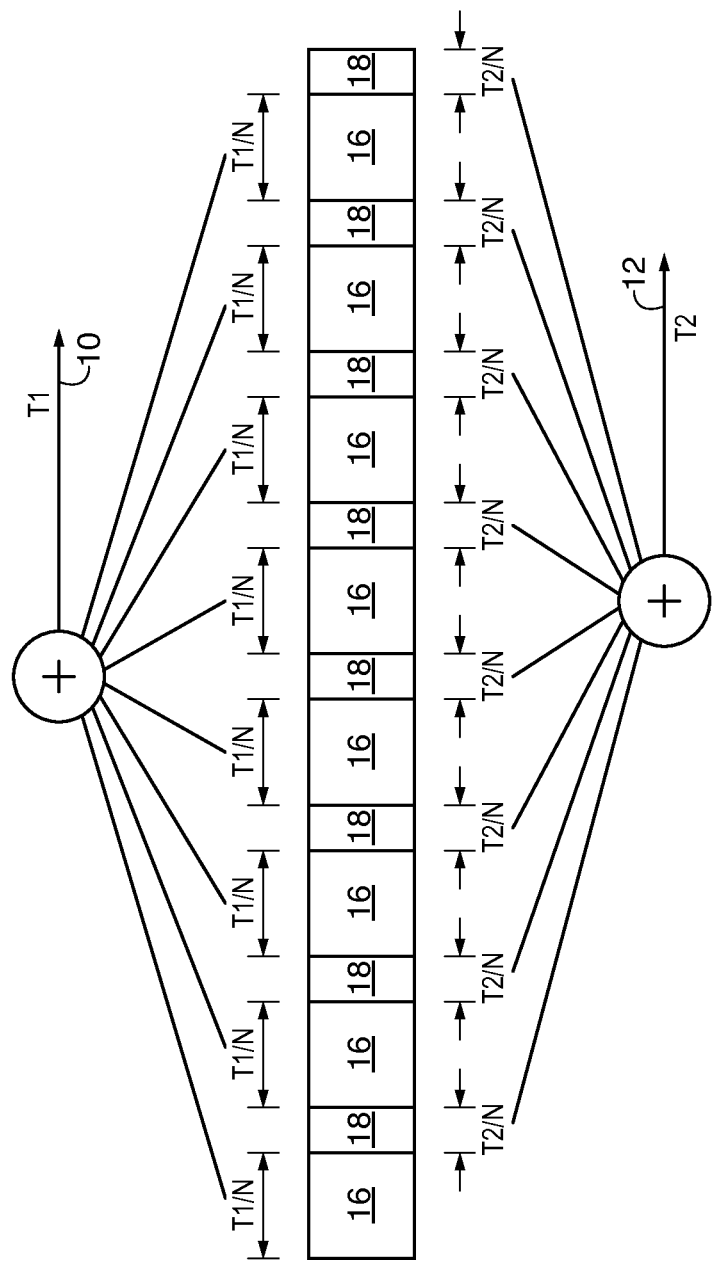
FIG. 2 is a diagram of a conventional multi-exposure high dynamic range imaging technique using a multi-storage pixel.

A conventional technique for high dynamic range imaging using multi-storage pixels is shown in FIG. 2. In the example of FIG. 2, long exposure image 10 and short exposure image 12 are interleaved in time. Photo-generated charge at a photodiode is transferred alternately between two storage nodes during a signal exposure. The desired exposure ratio is determined by the din) cycles of the storage nodes being selected. As a result, long exposure image 10 is separated into N portions 16 each having time T1/N that together add up to time T1. Short exposure image 12 is separated into N portions 18 each having time T1/N that together add up to time T2. Having short exposure image 12 divided into portions 18 that are spread out in time can make it easier to catch brief events such as LED signals. However, the total time taken to capture the long exposure image 10 becomes greater. For example, the time between the start of the first segment 16 and the end of the last segment 16 is greater than in the examples of FIGS. 1A and 1B. As a result, if there is motion in the scene images 10 and 12 captured using the technique of FIG. 2 might be more blurry than those captured using the techniques of FIGS. 1A and 1B.

Figure 3:
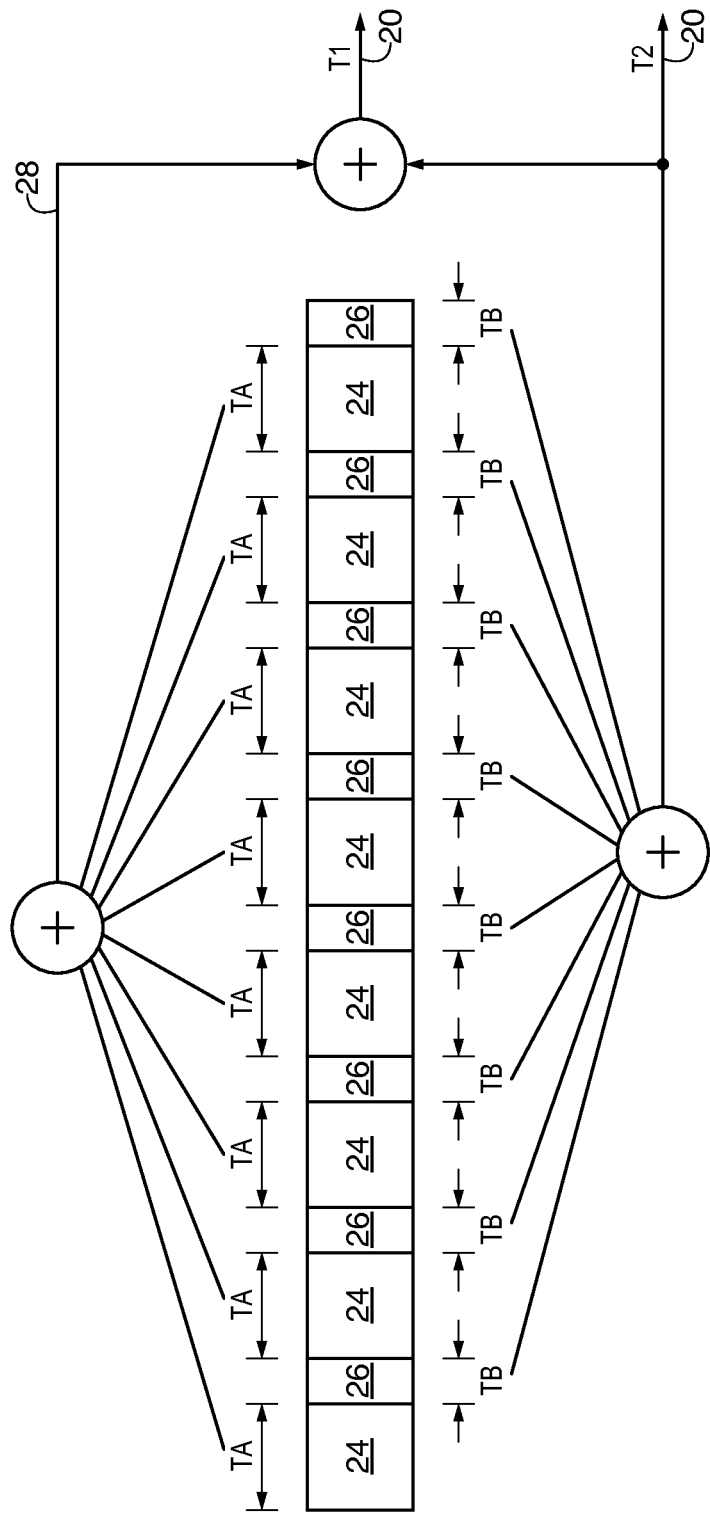
FIG. 3 is a diagram of an illustrative multi-exposure high dynamic range imaging technique using a multi-storage pixel in accordance with an embodiment of the present invention.

An illustrative multi-exposure high dynamic range imaging technique in accordance with an embodiment of the present invention is shown in FIG. 3. In the example of FIG. 3, segments 24 and segments 26 are interleaved in time. The segments 24 may each have a duration TA. The segments 26 may each have a duration TB. There may be the same number N of segments 24 as segments 26. Or if desired, there may be a different number of segments 24 as segments 26. For example, the number of segments 24 and the number segments 26 may differ by one. The number N may be any suitable number. For example, N may be two or more, three or more, two to ten, or other suitable numbers.

During a single exposure, photo-generated charge in a photodiode may be transferred alternately between two storage nodes with a duty cycle equal to (T1−T2)/T2. The segments 24 may each have time TA that is equal to (T1−T2)/N. Each segment 26 may have an exposure time TB that is equal to T2/N. As a result, an image 28 captured by a first storage node, formed from segments 24, may correspond to a time span of T1-T2. Short exposure image 22, formed from segments 26, may correspond to a time span of T2. Long exposure image 20 having exposure time T1 may be obtained by summing all of the segments 24 as well as all of the segments 26. A ratio of exposure times T1/T2 may be a suitable ratio such as 10 or greater, 100 or greater, 1000 or greater, or other suitable ratios.

The amount of time between the start of the first segment 24 and the end of the last segment 24 is T1, which is less than that of the conventional method of FIG. 2. As a result, there may be reduced blurring due to motion in the scene.

In the example of FIG. 3, two multi-exposure images 20 and 22 are captured and used to form a high dynamic range image. In general, three, four, or any suitable number of multi-exposure images may be used to form a high dynamic range image.

Images 20 and 22 may be captured during a single exposure of an image sensor. Light from a scene may be continuously incident on photodiodes in an image sensor during a single exposure. However, images 20 and 22 may still have associated exposure times and be known as multi-exposure images. The exposure times of images 20 and 22 represent the durations that charge was collected in the photodiodes for those images.

Figure 4:
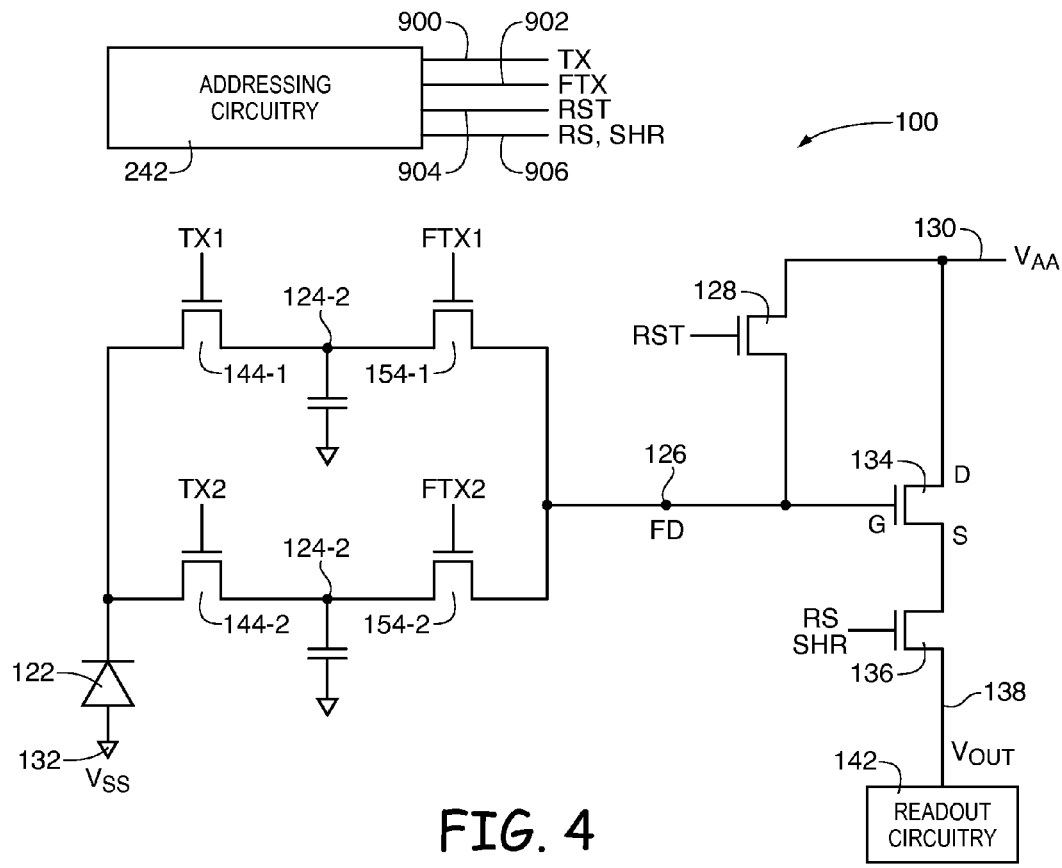
FIG. 4 is a diagram of an illustrative multi-storage pixel having two storage nodes that may be used for high dynamic range imaging in accordance with an embodiment of present invention.

FIG. 4 is a circuit diagram of an illustrative multi-storage-node image pixel 100 that can be used for single exposure high-dynamic range imaging in accordance with an embodiment of the present invention. Multi-storage-node pixel 100 may also be known as a multi-storage pixel, or as a pixel. In the example of FIG. 4, pixel 100 has two storage nodes 124 (e.g., storage nodes 124-1, 124-2), each storage node 124 having an accompanying transfer gate 144 (e.g. 144-1, 144-2) and floating diffusion node transfer gate 154 (e.g. 154-1, 154-2). If desired, pixel 100 may have other suitable number of storage nodes 124 such as three storage nodes 124, four storage nodes 124, or more storage nodes 124.

As shown in FIG. 4, multi-storage-node pixel 100 may include a photosensitive element such as a photodiode 122 coupled between a ground terminal 132 and two storage node transfer gates 144 (e.g., storage region transfer gates 144-1, 144-2). In the example of FIG. 4, a first storage node transfer gate 144-1 may be coupled between photodiode 122 and a first storage node 124-1 and a second storage node transfer gate 144-2 may be coupled between photodiode 122 and a second storage node 124-2. Storage node transfer gates may sometimes be referred to as storage region transfer gates or as transistors. Storage nodes 124 (e.g., storage regions 124-1, 124-2) may be implemented using photodiode-like structures, capacitors, or other suitable components that store charge.

Floating diffusion node transfer gates 154 may be coupled between storage nodes 124 and a floating diffusion node 126 (e.g., a first floating diffusion node transfer gate 154-1 may be coupled between first storage node 124-1 and floating diffusion node 126, a second floating diffusion node transfer gate 154-2 may be coupled between second storage node 124-2 and floating diffusion node 126 etc.). Floating diffusion node transfer gates may sometimes be referred to as floating diffusion region transfer gates. Stored charge may be selectively transferred to floating diffusion node 126 one at a time (e.g., floating diffusion node 126 may receive charge from only one of storage nodes 124 at any given point in time during charge readout operations), or stored charge from more than one storage node 124 may be summed at floating diffusion node 126. Charge may be temporarily stored at floating diffusion node 126 prior to being read out of pixel 100.

Floating diffusion node 126 may be coupled to reset transistor 128 and source follower transistor 134. The drain D of source follower transistor 134 and reset transistor 128 may be coupled to a positive power supply terminal 130 (e.g., a power supply terminal on which a positive power supply voltage $V_{AA}$ or another reset-level voltage may be provided). A row select transistor 136 may be coupled to an output path 138 and source S of source follower 134. Output path 138 may be coupled to readout circuitry 142. Output signals $V_{OUT}$ may be formed on output path 138 for sampling by readout circuitry 142.

Incoming light may be detected by a photosensitive element such as photodiode 122. Charge may be generated in photodiode 122 from the incident light. The image sensor on which pixel 100 is formed may also include addressing circuitry 242. Addressing circuit 242 may be used to provide control signals to storage node transfer gates 144 via path 900, to floating diffusion node transfer gates 154 via path 902, to reset transistor 128 via path 904, and to row select transistor 136 via path 906. In particular, addressing circuitry 242 may feed transfer signals TX to storage node transfer gates 144 via path 900 (e.g. a first transfer signal TX1 may be fed to first storage node transfer gate 144-1, a second transfer signal TX2 may be fed to second storage node transfer gate 144-2, etc.). During exposure of the multi-storage-node image pixels 100, transfer signals TX may be asserted for a particular storage node transfer gate 144, allowing an pixel signal created by photodiode 122 in response to incoming light to floss to the associated storage node 124.

Addressing circuitry 242 may supply floating diffusion node transfer gate control signals FTX to floating diffusion node transfer gates 154 via path 902 (e.g., a first floating diffusion node transfer signal FTX1 may be supplied to a first floating diffusion node transfer gate 154-1, a second floating diffusion node transfer signal FTX2 may be supplied to a second floating diffusion node transfer gate 154-2, etc.). When the floating diffusion node transfer gate control signals are asserted, pixel signals stored in storage nodes 124 may be transferred to floating diffusion node 126. The pixel signals on floating diffusion region 126 are conveyed to row select transistor 136 by source-follower transistor 134. During a pixel readout phase, readout circuitry 142 may provide an asserted row select signal RS to row select transistor 136 to allow the pixel signals to be conveyed to readout circuitry 142 through output path 138. Prior to a pixel readout phase, readout circuitry 142 may assert reset signal RST to reset floating diffusion node 126 to voltage $V_{AA}$. A sample-and-hold signal SHR may then be asserted to sample the reset voltage at floating diffusion node 126.

Figure 5:
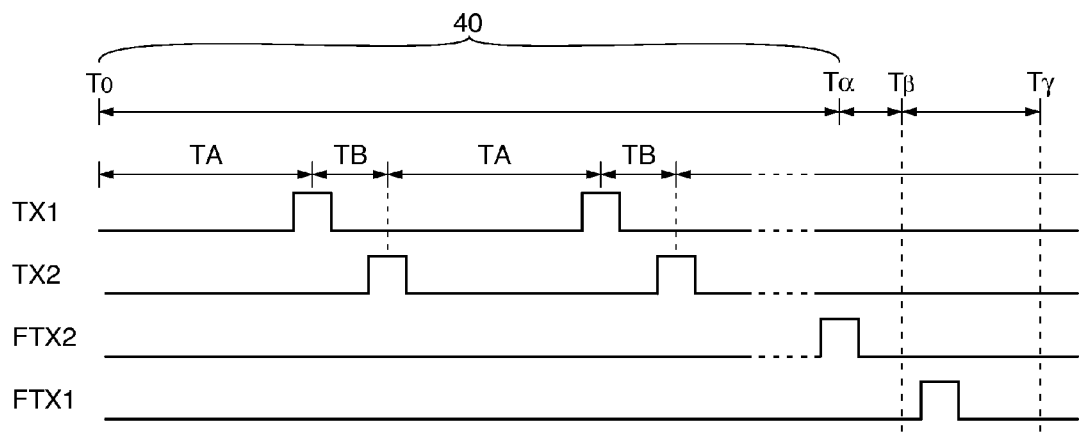
FIG. 5 is a diagram of an illustrative timing diagram that may be used with the multi-storage pixel of FIG. 4 in accordance with an embodiment of the present invention.

FIG. 5 is an illustrative timing diagram that maybe used during a single exposure of multi-storage pixel 100 of FIG. 4.

During as single exposure 40 from time T0 and Tα, light incident on photodiode 122 of FIG. 4 may be alternately transferred by transfer gate 144-1 to storage node 124-1 and by transfer gate 144-2 to storage node 124-2. After a shutter opens at time T0, exposing photodiode 122 to incident light, signal TX1 may be driven high after a time TA, transferring charge from photodiode 122 to storage node 124-1. This charge may represent a pixel signal from a first segment 24 of time TA (see, e.g., FIG. 3). Signal TX1 is then driven low. After a subsequent time TB, signal TX2 may be driven high to transfer charge from photodiode 122 to storage node 124-1. This charge may represent a pixel signal from a first segment 26 of time TB (see, e.g., FIG. 3). These steps may be repeated until all segments 24 and 26 have been captured. Photodiode 122 of FIG. 4 may be continuously exposed to light while charge is being alternately transferred to storage node 124-1 and 124-2 (i.e., during a single exposure 40).

At time Tα, following the interval of exposure 40, charge stored at storage node 124-1 may be equal to the sum of all charge collected during segments 24 having time TA, e.g., image 28 having a total exposure time T1-T2 (see, e.g., FIG. 3). Charge stored at node 124-2 may be equal to the sum of all charge collected during segments 26 having time TB, e.g., image 22 having total exposure time T2 (see, e.g., FIG. 3). Diffusion node transfer signal FTX2 may be driven high to transfer charge front storage node 124-2 to floating diffusion node 126. The charge at floating diffusion node 126 may be read out at time Tβ as second image 22 having exposure time T2 (see, e.g. FIG. 3). Without rescuing floating diffusion node 126, diffusion node transfer signal FTX1 may be driven high to transfer charge from storage node 124-1 to floating diffusion node 126. The charge from storage node 124-1 is therefore summed with the charge from storage node 124-2 at floating diffusion node 126. The charge may be read out from floating diffusion node 126 at time Tγ as first image 20 having exposure time T1 (see, e.g. FIG. 3).

In the example of FIG. 5, floating diffusion node 126 is not reset between time Tβ and time Tγ. The example of FIG. 5 may result in faster readout and lower power consumption because a reset signal RST and sample-and-hold signal SHR are omitted between reading out image 22 having time T2 and image 20 having time T1. Floating diffusion node 126 is reset only once per exposure time 40.

In the example of FIGS. 3-5, two images 20 and 22 are captured using a two-storage-node pixel to be combined into a high dynamic range image. This is merely illustrative. The examples of FIG. 3-5 may be adapted for three storage nodes, four storage nodes, or more than four storage nodes.

Figure 6:
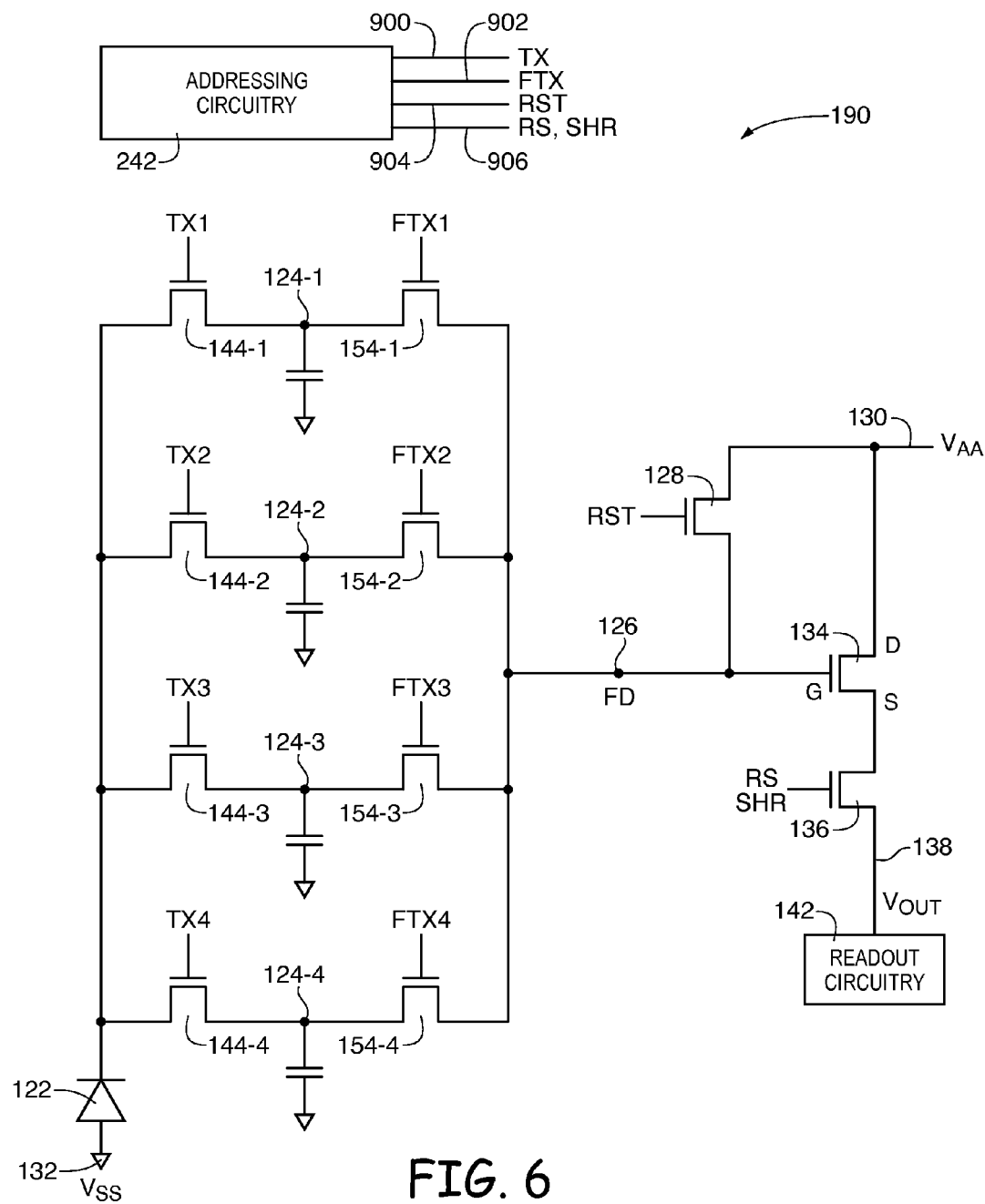
FIG. 6 is a diagram of an illustrative multi-storage pixel having four storage nodes that may be used for high dynamic range imaging in accordance with an embodiment of the present invention.

FIG. 6 is an example of a multi-storage pixel 190 having four storage nodes 124 (e.g., storage nodes 124-1, 124-2, 124-3, and 124-4), each storage node 125 having an accompanying transfer gate 144 (e.g., 144-1, 144-2, 144-3, and 144-4) and floating diffusion node transfer gate 154 (e.g., 154-1, 154-2, 154-3, and 154-4). Pixel 190 may be used for capturing four images that are combined to form a high dynamic range image.

In a case of four images having exposure times T1, T2, T3, and T4 are to be captured, time T1 may be the longest time, T2 the second longest time, T3 the third longest time, and T4 the shortest time. Charge generated at photodiode 122 may be transferred cyclically to storage nodes 124-1, 124-2, 124-3, and 124-4. At the end of a single exposure time, charge stored at storage node 124-2 may represent a signal with an exposure time of T4. Charge stored at storage node 124-3 may represent a signal with an exposure time of T3-T4. Charge stored at storage node 124-2 may represent a signal with an exposure time of T2-T3-T4. Charge stored at storage node 124-1 may represent a signal with an exposure time of T1-T2-T3-T4.

Figure 7:
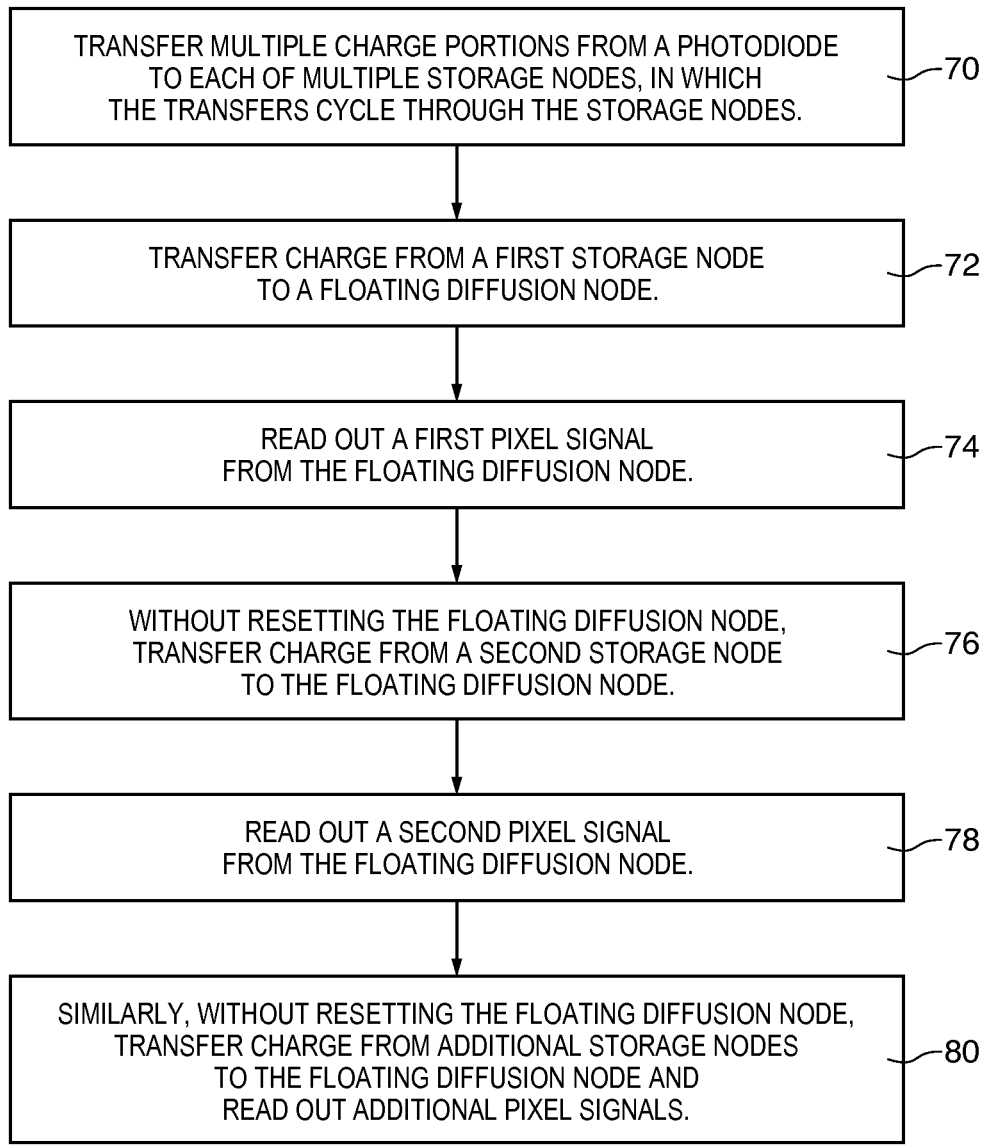
FIG. 7 is a flow chart of illustrative steps may be used in the high dynamic range imaging of FIGS. 3-6 in accordance with an embodiment of the present invention.

During readout of pixel 190 of FIG. 7, charge from storage node 124-4 may be transferred to floating diffusion 126. Floating diffusion 126 may be read out as a pixel signal having an exposure time T4. Charge from storage node 124-3 may be transferred to floating diffusion 126 and summed with the existing charge at floating diffusion 126. The charge at floating diffusion 126 may then be read out as a pixel signal having an exposure time T3. Similarly, charge from storage node 124-2 may be summed at floating diffusion 126 and read out as a pixel signal having an exposure time T2. Lastly, charge from storage node 124-1 may be summed at floating diffusion node 126 and read out as a pixel signal having an exposure time T1. Between read outs, floating diffusion node 126 is not reset.

FIG. 7 is an illustrative flow chart of steps that may be performed in the high dynamic range imaging of FIGS. 3-6. In step 70, multiple charge portions may be transferred from a photodiode to each of multiple storage nodes of a multi-storage pixel. The change transfers may cycle through the multiple storage nodes. For example, if a multi-storage pixel has two storage nodes, charge may be transferred to a first storage node, then to a second storage node, then again to the first storage node, and so forth. If, for example, a multi-storage pixel has four storage nodes, charge may be transferred to a first storage node, then to a second storage node, then to a third storage node, then to a fourth storage node, then again to the first storage node, and so forth.

As shown in step 72, charge may be transferred from a first storage node a floating diffusion node in the multi-storage pixel. As shown in step 74, a first pixel signal may be read out from the floating diffusion node.

As shown in step 76, without resetting the floating diffusion node, charge may be transferred from a second storage node to the floating diffusion node. As shown in step 78, a second pixel signal may be read out from the floating diffusion node.

As shown in step 80, for any additional storage nodes, without resetting the floating diffusion node, charge may be transferred from the additional storage nodes to the floating diffusion nodes and additional pixel signal may be read out from the floating diffusion node.

Figure 8:
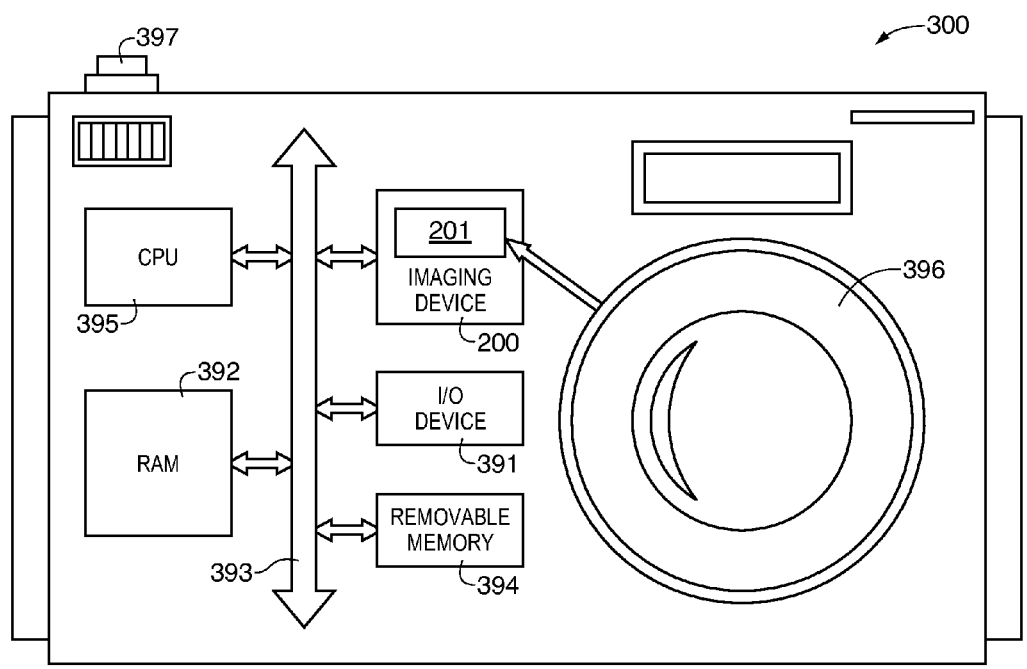
FIG. 8 is a block diagram of a processor system that may be used for the high dynamic range imaging of FIGS. 3-7 in accordance with an embodiment of the present invention.

FIG. 8 shows in simplified form a typical processor system 300, such as a digital camera, which includes an imaging device such as imaging device 200 employing an image sensor having multi-storage pixels of FIGS. 3-7. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Pixel array 201 may have multi-storage pixels of FIGS. 3-6. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Multi-exposure images may be combined into a high dynamic range image with processor system 300. Multi-exposure images may be combined into a high dynamic, range image at a hardwired image processor in processor system 300. If desired, multi-exposure images may be processed by CPU 395 using software stored in a non-transitory computer-readable storage medium in processor system 300.

Various embodiments have been described illustrating high dynamic range imaging with an image sensor having multi-storage pixels. Multi-storage pixels may have two storage nodes, four storage nodes, or other suitable numbers of storage nodes. Each multi-storage pixel may have a photodiode and a floating diffusion node.

Multiple images may be taken during a single exposure of the multi-storage pixels. During a single exposure, a photodiode may be continuously exposed to light from a scene. During the single exposure, charge may be transferred from the photodiode to multiple storage nodes. If a multi-storage pixel has two storage nodes, charge may be transferred in an alternating way between the two storage nodes. If, for example, a multi-storage pixel has four storage nodes, charge may transferred in a way that cycles through the four storage nodes.

Although all the charge that is stored in all the storage nodes of a multi-storage pixel may have been collected during a single exposure, each charge portion may still have an associated exposure time, which represents the amount of that that portion of charge was exposed to incident light while that portion of charge was being collected in the photodiode.

Following the single exposure, charge may transferred from a first storage node to a floating diffusion node. A pixel signal may be read out from the floating diffusion node. This pixel signal, together with the pixel signals read out at this stage from the other pixels in the image sensor, form a first image having a first exposure time.

Without resetting the floating diffusion node, charge from a second storage node may be transferred to the floating diffusion node and summed with the charge already at the floating diffusion node. Pixel signals read out at this stage form a second image having a second exposure time. The second exposure is a sum of the associated exposure times of the charge from the first storage node and the associated exposure times of the charge from the second storage node.

Similarly, if there are additional storage nodes in the pixel, charge from the additional pixel signals may be transferred to the floating diffusion node and summed with the existing charge at the floating diffusion node, without resetting the floating diffusion node between charge transfers. Pixel signals may be read out to form additional images with additional exposure times.

The first, second, and any additional images may form a set of multi-exposure images. The multi-exposure images may be combined to form a high dynamic range (HDR) image. A high dynamic range image may be an image having a dynamic range that is higher than a native dynamic range of an image sensor. Multi-exposure images may be combined using a hardwired image processor, or, if desired, using software implemented on a computer.

The foregoing is merely illustrative of the principles of this invention which can be practiced in other embodiments.

What is claimed is:

1. A method for capturing images with an image sensor having multi-storage pixels, wherein each multi-storage pixel has a photodiode, at least first and second storage nodes, and a floating diffusion node, for each multi-storage pixel the method comprising:
   transferring from the photodiode at least first and second pluralities of charge portions to the at least first and second storage nodes, respectively;
   summing the first plurality of charge portions to produce a first stored charge at the first storage node;
   summing the second plurality of charge portions to produce a second stored charge at the second storage node;
   transferring the first stored charge from the first storage node to a floating diffusion node;
   reading out the first stored charge from the floating diffusion node as a first pixel signal having a first exposure time, without resetting the floating diffusion node;
   transferring the second stored charge from the second storage node to the floating diffusion node;
   reading out a sum of the first and second stored charges from the floating diffusion node as a second pixel signal having a second exposure time, wherein the at least first and second storage nodes comprise first, second, third, and fourth storage nodes and wherein the at least first and second pluralities of charge portions comprise first, second, third, and fourth pluralities of charge portions, without resetting the floating diffusion node;
   transferring the third stored charge from the third storage node to the floating diffusion node;
   reading out a sum of the first, second and third stored charges from the floating diffusion node as a third pixel signal having a third exposure time, without resetting the floating diffusion node;
   transferring the fourth stored charge from the fourth storage node to the floating diffusion node; and
   reading out a sum of the first, second, third, and fourth stored charges from the floating diffusion node as a fourth pixel signal having a fourth exposure time.

2. The method defined in claim 1, further comprising:
   forming a first image from the first pixel signal from each multi-storage pixel, wherein the first image has the first exposure time; and
   forming a second image from the second pixel signal from each multi-storage pixel, wherein the second image has the second exposure time, wherein the first exposure time is less than the second exposure time.

3. The method defined in claim 2, further comprising:
   combining the first and second images to produce a high dynamic range image, where in the high dynamic range image has a dynamic range that is higher than an associated dynamic range of the image sensor.

4. The method defined in claim 1, wherein transferring from the photodiode at least first and second pluralities of charge portions to the at least first and second storage nodes, respectively, comprises transferring one of the first pluralities of charge portions in between transferring each one of the second pluralities of charge portions.

5. The method defined in claim 1, further comprising:
   combining the first, second, third, and fourth images to produce a high dynamic range image, where in the high dynamic range image has a dynamic range that is higher than an associated dynamic range of the image sensor.

6. The method defined in claim 5, wherein transferring from the photodiode the first, second, third, and fourth pluralities of charge portions to the first second, third, and fourth storage nodes, respectively, comprises transferring the first, second, third, and fourth pluralities of charge portions such the charge portions from a given one of the first, second, third, and fourth pluralities of charge portions are separated by at least one charge portion from another one of the first, second, third, and fourth pluralities of charge portions.

7. A method for producing a high dynamic range image with an image sensor having an array of multi-storage pixels, wherein each multi-storage pixel has a photodiode and at least first and second storage nodes, the method comprising:
during a single exposure, cyclically transferring charge from a photodiode to at least first and second storage nodes in a multi-storage pixel, wherein at least two charge transfer operations are performed for each storage node during the single exposure without resetting the storage nodes;
transferring a first stored charge from the first storage node to a floating diffusion node;
reading out a first pixel signal from the floating diffusion node;
transferring a second stored charge from the second storage node to the floating diffusion node, wherein the second stored charge is summed with the first stored charge at the floating diffusion node;
reading out a second pixel signal from the floating diffusion node; and
combining at least the first and second pixel signals for each multi-storage pixel in the array in producing a high dynamic range image.

8. The method defined in claim 7, wherein the at least first and second storage nodes comprises first, second, and third storage nodes, the method further comprising:
transferring a third stored charge from the third storage node to the floating diffusion node, wherein the third stored charge is summed with the first and second stored charges at the floating diffusion node; and
reading out a third pixel signal from the floating diffusion node, wherein combining the at least first and second pixel signals comprises combining at least the first, second, and third pixel signals.

9. The method defined in claim 7, wherein the at least first and second storage nodes comprise first, second, third, and fourth storage nodes, the method further comprising:
transferring a third stored charge from the third storage node to the floating diffusion node, wherein the third stored charge is summed with the first and second stored charges at the floating diffusion node;
reading out a third pixel signal from the floating diffusion node,
transferring a fourth stored charge from the fourth storage node to the floating diffusion node, wherein the fourth stored charge is summed with the first, second, and third stored charges at the floating diffusion node; and
reading out a fourth pixel signal from the floating diffusion node, wherein combining the at least first and second pixel signals comprises combining the first, second, third and fourth pixel signals.

10. The method defined in claim 7, wherein the first stored charge is divided into a plurality of first portions, wherein the second stored charge is divided into a plurality of second portions, and wherein cyclically transferring charge from a photodiode to at least first and second storage nodes in a multi-storage pixel comprises:
alternating between transferring one of the plurality of first portions to the first storage node and transferring one of the plurality of second portions to the second storage node.

11. The method defined in claim 10, wherein alternating between transferring one of the plurality of first portions to the first storage node and transferring one of the plurality of second portions to the second storage node comprises:
alternating between transferring one of the plurality of first portions via a first transfer gate to the first storage node and transferring one of the plurality of second portions via a second transfer gate to the second storage node.

12. The method defined in claim 7, wherein transferring the first stored charge from the first storage node to the floating diffusion node comprises transferring the first stored charge through a first floating diffusion node transfer gate.

13. The method defined in claim 12, wherein transferring the second stored charge from the second storage node to the floating diffusion node comprises transferring the second stored charge through a second floating diffusion node transfer gate.

14. A system, comprising:
a central processing unit;
memory;
input-output circuitry; and
an imaging device, wherein the imaging device comprises:
a pixel array having multi-storage pixels, wherein each multi-storage pixel comprises a floating diffusion node; and
a lens that focuses an image on the pixel array, wherein the imaging device is configured to capture multiple images during a single exposure of the pixel array and wherein the imaging device is configured to reset the floating diffusion node only once per each single exposure of the pixel array, wherein the multi-storage pixels each further comprise:
a photodiode;
four storage nodes coupled to a floating diffusion node via respective charge transfer gates; and
control circuitry, wherein the control circuitry is configured to control additional charge transfer gates to perform multiple charge transfer operations from the photodiode to each of the four storage nodes without resetting the four storage nodes during the single exposure.

15. The system defined in claim 14, wherein the central processing unit is configured to combine the multiple images to produce a high dynamic range image, wherein the high dynamic range image has a dynamic range that is higher than a dynamic range of the imaging device.

16. The system defined in claim 15, wherein the multi-storage pixel further comprises multiple storage nodes, wherein the imaging device is configured to sum charge portions from the multiple storage nodes at the floating diffusion node.

* * * * *